(12) United States Patent
Fischer et al.

(10) Patent No.: US 10,351,186 B1
(45) Date of Patent: Jul. 16, 2019

(54) UNDERCARRIAGE SUPPORT FOR A TRACK CHAIN

(71) Applicant: Caterpillar Inc., Peoria, IL (US)

(72) Inventors: Luke B. Fischer, Roanoke, IL (US); David F. Schaefer, Princeville, IL (US)

(73) Assignee: Caterpillar Inc., Deerfield, IL (US)

( * ) Notice: Subject to any disclaimer, the term of this patent is extended or adjusted under 35 U.S.C. 154(b) by 4 days.

(21) Appl. No.: 15/859,406

(22) Filed: Dec. 30, 2017

(51) Int. Cl.
*B62D 55/14* (2006.01)
*B62D 55/10* (2006.01)
*B62D 55/20* (2006.01)
*B62D 55/06* (2006.01)

(52) U.S. Cl.
CPC ............. *B62D 55/14* (2013.01); *B62D 55/06* (2013.01); *B62D 55/10* (2013.01); *B62D 55/20* (2013.01)

(58) Field of Classification Search
CPC ........ B62D 55/14; B62D 55/06; B62D 55/10; B62D 55/20
USPC .................................. 305/136, 137, 140, 142
See application file for complete search history.

(56) References Cited

U.S. PATENT DOCUMENTS

| | | | | | |
|---|---|---|---|---|---|
| 1,975,726 | A | * | 10/1934 | Martinage | B62D 55/253 305/108 |
| 5,456,331 | A | * | 10/1995 | Gustin | B62D 55/14 180/9.1 |
| 5,494,125 | A | * | 2/1996 | Gustin | B62D 55/14 180/9.1 |
| 7,806,209 | B2 | * | 10/2010 | Standish | B62D 55/096 180/9.1 |
| 2016/0052569 | A1 | * | 2/2016 | Buchanan | B62D 55/08 305/142 |

* cited by examiner

*Primary Examiner* — S. Joseph Morano
*Assistant Examiner* — Jean W Charleston
(74) *Attorney, Agent, or Firm* — Law Office of Kurt J. Fugman LLC

(57) ABSTRACT

An undercarriage includes a plurality of bottom support rollers defining a bottom support roller platform distance and front and rear wheels defining a wheel pitch distance, and a track chain defining a link pitch distance and a ratio of the bottom support roller platform distance to the wheel pitch distance ranges from 0.70 to 0.95 and a ratio of the roller spacing distance to the link pitch distance ranges from 0.75 link pitch distance to 1.50 link pitch distances.

16 Claims, 10 Drawing Sheets

FIG. 5

| D6T LGP HORIZON U/C COMPARISON | | | | |
|---|---|---|---|---|
| | DIST. 226 (mm) | IMPROVEMENT | ROLLER SPACING DIST. 240 (VERSUS LINK PITCH DISTANCE 222) | IMPROVEMENT |
| 45 SECTION LGP - LUC 8 ROLLER | 2209 | BASELINE (mm) | 1.55 | BASELINE (LINK PITCH DISTANCE 222) |
| 45 SECTION LGP - LUC 10 ROLLER | 2490 | 281 | 1.36 | -0.19 |
| 46 SECTION LGP - HORIZON 8 ROLLER | 2394 | 185 | 1.69 | -0.14 |
| 46 SECTION LGP - HORIZON 10 ROLLER | 2556 | 347 | 1.4 | -0.15 |

D6T XL HORIZON U/C COMPARISON

| | DIST. 226 (mm) | IMPROVEMENT | ROLLER SPACING DIST. 240 (VERSUS LINK PITCH DISTANCE 222) | IMPROVEMENT |
|---|---|---|---|---|
| 41 SECTION XL | 1987 | BASELINE (mm) | 1.63 | BASELINE (LINK PITCH DISTANCE 222) |
| 42 SECTION XL - PD | 2070 | 83 | 1.73 | 0.1 |
| 42 SECTION XL - TESTBED (8) | 2187 | 200 | 1.54 | -0.09 |
| 42 SECTION XL - TESTBED (9) | 2187 | 200 | 1.35 | -0.28 |

D6T LGP HORIZON U/C COMPARISON

| | DIST. 226 (mm) | IMPROVEMENT | ROLLER SPACING DIST. 240 (VERSUS LINK PITCH DISTANCE 222) | IMPROVEMENT |
|---|---|---|---|---|
| 45 SECTION LGP – LUC 8 ROLLER | 2209 | BASELINE (mm) | 1.55 | BASELINE (LINK PITCH DISTANCE 222) |
| 45 SECTION LGP – LUC 10 ROLLER | 2490 | 281 | 1.36 | -0.19 |
| 45 SECTION LGP – HORIZON 8 ROLLER | 2403 | 194 | 1.66 | 0.11 |
| 45 SECTION LGP – HORIZON 10 ROLLER | 2477 | 268 | 1.36 | -0.19 |

| D6T ROLLER PLATFORM OPTIMIZATION | | | | | | | | | |
|---|---|---|---|---|---|---|---|---|---|
| | # OF LINKS | DIST. 228 (mm) | DIST. 228 (PITCHES) | DIST. 232 (mm) | DIST. 232 (PITCHES) | DIST. 226 (mm) | DIST. 226 (PITCHES) | DIST. 230 (mm) | DIST. 230 (PITCHES) |
| D6T XL | 41 | 2820.0 | 13.9 | 440.0 | 2.2 | 1987.0 | 9.8 | 393.0 | 1.94 |
| JD 850K XL | | 2793.0 | 13.8 | 471.0 | 2.3 | 1773.0 | 8.7 | 550.0 | 2.71 |
| D6T LGP | 45 | 3250.0 | 16.0 | 531.0 | 2.6 | 2209.0 | 10.9 | 510.0 | 2.51 |
| D6T LGP - 10a PROD FEAS. | | 3355.00 | | 355.0 | 1.8 | 2490.0 | 12.3 | 405.0 | 2.00 |
| D6T HORIZON LGP | 46 | 3355.00 | 16.5 | 465.0 | 2.3 | 2415.0 | 11.9 | 475.0 | 2.34 |
| D6T HORIZON LGP FG | 46 | 3355.00 | 16.5 | 413.7 | 2.0 | 2656.0 | 12.6 | 385.3 | 1.90 |

*FIG. 10*

UNDERCARRIAGE SUPPORT FOR A TRACK CHAIN

TECHNICAL FIELD

The present disclosure relates to a method and apparatus for providing support for a track chain used on an endless undercarriage drive employed by earth moving, construction and mining equipment and the like. Specifically, the present disclosure relates to a method and apparatus that provide enough undercarriage support to help prevent backbend of the track chain as well as limit the amount of the bounce of a work implement attached to the equipment as the equipment is moving.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, machines using a track chain may experience various problems as the machine moves.

For example, a track-type tractor track chain does not always roll smoothly over the idlers and bottom support rollers as the machine moves on various types of surfaces such as rock, gravel, or sandy surfaces. The chain can backbend (bunch up) in between idlers and bottom rollers, causing the machine and its associated work implement to bounce. Customer use of GPS (Global Positioning System) blade control is increasing, which drives higher performance expectations for the machine to be able to leave a very smooth graded surface.

Mechanisms such as hydraulic cylinders are used to move an idler wheel such as a front idler wheel to adjust the tension in the track. Greater tension may prevent some of the aforementioned problems. However, increased tension may result in a faster rate of wear for the components of the track chain, necessitating earlier maintenance of the track chain, leading to downtime for the machine and an associated economic loss for a business endeavor using the machine.

Accordingly, it would be beneficial if an apparatus and method were developed that could overcome any of the aforementioned problems without increasing the rate of wear for the components of the track chain.

SUMMARY

An undercarriage configured to support a track chain and to be attached to a machine with an endless track drive according to an embodiment of the present disclosure is provided. The undercarriage comprises a plurality of bottom support rollers rotatably attached to the undercarriage including a front bottom support roller defining a front bottom support roller rotational axis and a rear bottom support roller defining a rear bottom support roller rotational axis, and further defining a bottom support roller platform distance measured from the front bottom support roller rotational axis to the rear bottom support roller rotational axis and a roller spacing distance measured from the centerline of one bottom support roller to the centerline of the adjacent bottom support roller, a front wheel rotatably attached to the undercarriage, defining a front wheel rotational axis; a rear wheel rotatably attached to the undercarriage, defining a rear wheel rotational axis, and a track chain including sets of links, each set of links being joined to each other by a track pin or bushing, defining a track pin longitudinal axis or a bushing longitudinal axis and a link pitch distance equivalent to the overall length of one link, wherein the front wheel rotational axis and the rear wheel rotational axis are positioned vertically above relative to the front bottom support roller rotational axis and the rear bottom support roller rotational axis, and the undercarriage further defines a wheel pitch distance measured from the front wheel rotational axis to the rear wheel rotational axis, and a ratio of the bottom support roller platform distance to the wheel pitch distance ranges from 0.70 to 0.95 and a ratio of the roller spacing distance to the link pitch distance ranges from 0.75 link pitch distances to 1.50 link pitch distances.

An undercarriage configured to support a track chain and be attached to a machine with an endless track drive according to an embodiment of the present disclosure is provided. The undercarriage comprises a plurality of bottom support rollers rotatably attached to the undercarriage including a front bottom support roller defining a front bottom support roller rotational axis and a rear bottom support roller defining a rear bottom support roller rotational axis, and further defining a bottom support roller platform distance measured from the front bottom support roller rotational axis to the rear bottom support roller rotational axis a roller spacing distance measured from the centerline of one bottom support roller to the centerline of the adjacent bottom support roller, a front wheel rotatably attached to the undercarriage, defining a front wheel rotational axis, a rear wheel rotatably attached to the undercarriage, defining a rear wheel rotational axis; and a track chain routed about the plurality of bottom support rollers, front wheel, and rear wheel, the track chain including sets of links, each set of links being joined to each other by a track pin or bushing, defining a track pin longitudinal axis or a bushing longitudinal axis and a link pitch distance equivalent to the overall length of one link; wherein the front wheel rotational axis and the rear wheel rotational axis are positioned vertically above relative to the front bottom support roller rotational axis and the rear bottom support roller rotational axis, and the undercarriage further defines a wheel pitch distance measured from the front wheel rotational axis to the rear wheel rotational axis, and a front transitional zone distance measured from the front bottom support roller rotational axis to the front wheel rotational axis along a direction parallel with the bottom support roller platform distance, and a ratio of the front transitional zone distance to the link pitch distance ranges from 1.0 to 2.30 link pitch distances, and a ratio of the roller spacing distance to the link pitch distance ranges from 0.75 link pitch distances to 1.50 link pitch distances.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 5 is a table showing some dimensions of an undercarriage supporting a track chain using eight or ten bottom support rollers according to various embodiments of the present disclosure such as those whose performance is shown in FIGS. 3 and 4.

FIG. 8 is a table showing some dimensions of an undercarriage supporting a track chain using eight or ten bottom support rollers according to various embodiments of the present disclosure such as those whose performance is shown in FIGS. 6 and 7.

FIG. 9 is a table showing some dimensions of an undercarriage supporting a track chain using eight or ten bottom support rollers according to various emodiments of the present disclosure such as those whose performance is shown in FIG. 5.

FIG. 10 contains a table showing some optimized dimensions of a D6T Roller Platform (undercarriage).

DETAILED DESCRIPTION

Figure 1:
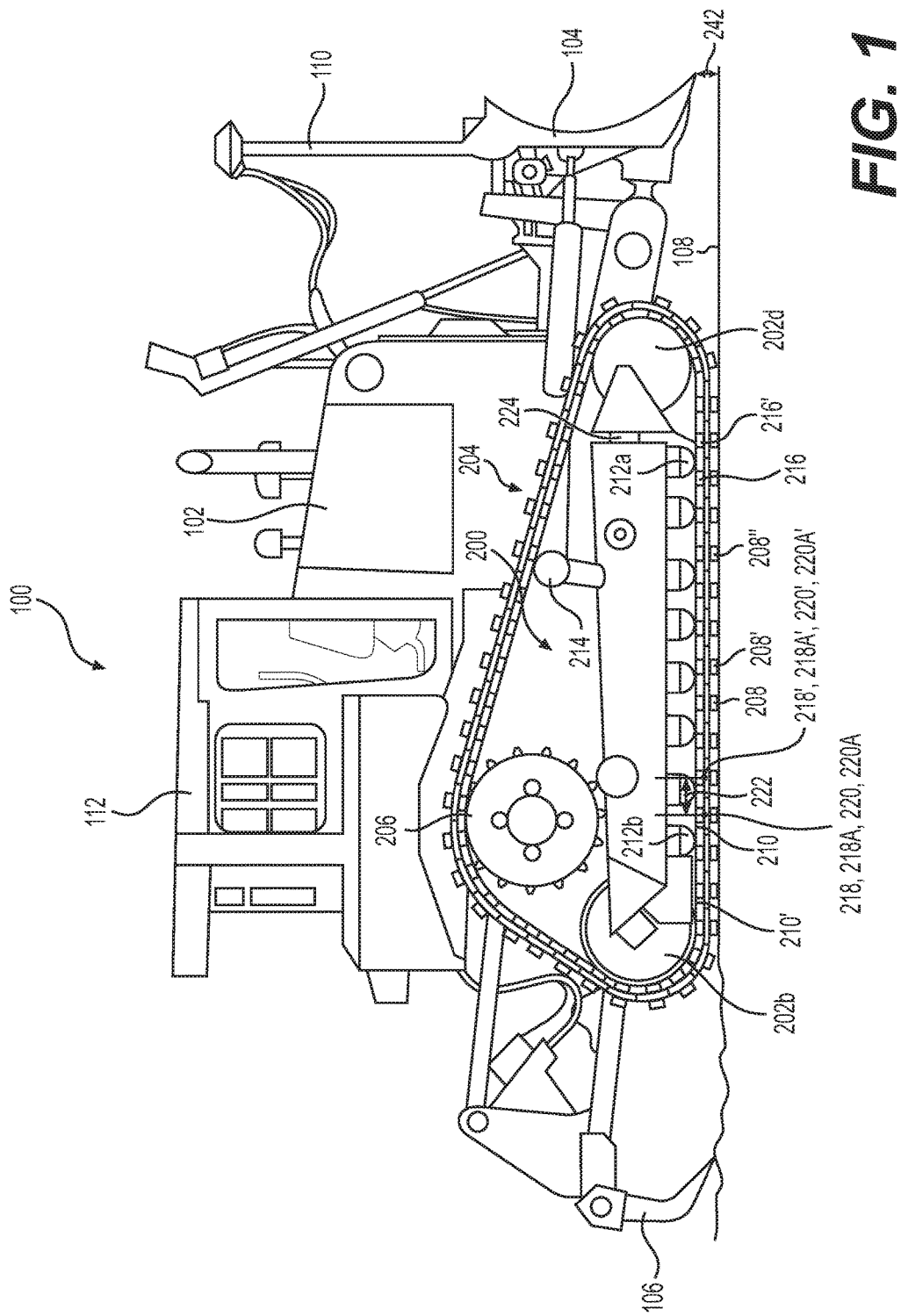
FIG. 1 is a side-view of a machine that may use various configurations of an undercarriage supporting the track chain according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for providing an undercarriage that supports a track chain according to the present application will now be described. In some embodiments, the ratio of the bottom support roller platform distance to the wheel pitch within a specified range will be discussed. In other embodiments, a ratio of the transitional zone distance to the bottom roller spacing within a specified range will be discussed. Other dimensions and ratios of dimensions regarding various embodiments of the present disclosure will also be discussed.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer (as shown in FIG. 1), a loader, a backhoe, a motor grader, or any other earth moving machine. Machine 100 may include a power source 102 and an undercarriage 200, which may be driven by power source 102 and supported by one or more spaced-apart idler wheels 202 (front idler wheel is denoted by 202a while the rear idler wheel is denoted by 202b).

Power source 102 may drive the track chain 204 of the undercarriage 200 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known or that will be devised in the art.

The undercarriage 200 may include two separate continuous track chains 204, one on either side of machine 100 (only one of which is shown in FIG. 1). Each track chain may be driven by power source 102 via one or more drive sprockets 206. In addition, each track chain 204 may include a plurality of track shoes 208, each configured to selectively engage a surface, e.g., the ground surface 108. Each track chain 204 may include a plurality of link subassemblies 210. Bottom support rollers 212 are also provided at the bottom of the undercarriage 200 to support the track chain 204 and a top support roller 214 is provided forward of the elevated drive sprocket 206 to provide support to the track chain 204 between the elevated drive sprocket 206 and the front idler wheel 202a.

The machine 100 includes an elevated drive sprocket 206 that is mounted on the undercarriage 200 of the machine 100, meaning that the drive sprocket 206 is disposed vertically above the front idler wheel 202a and the rear idler wheel 202b. It is to be understood that inline drive sprockets may be provided in other embodiments (e.g. rear idler wheel 202b may be replaced with a drive sprocket 206). The track chain 204 is routed about the front idler wheel 202a, and the rear idler wheel 202b and under the bottom support rollers 212 and over the top support roller 214. The track chain 204 comprises 42 to 46 sets of links 216, each set of links 216 being joined to each other by a track pin 218 or bushing 220, defining a track pin longitudinal axis 218A or a bushing longitudinal axis 220A and link pitch distance 222 from one track pin longitudinal axis 218A to the adjacent track pin longitudinal axis 218A'. In other embodiments, 41 sets of links 216 may be used, etc. Alternatively, the link pitch distance 222 may be equal to the overall length of the track link 216. Ratios of other dimensions to the link pitch distance are expressed as the number of link pitch distances equivalent to any particular dimension.

A work implement such as a blade 104 may be attached to the front of the machine 100 while a ripper 106 may be attached to the rear of the machine 100. Either the ripper 106 or blade 104 may be omitted in other embodiments. For any of the embodiments discussed herein, the undercarriage 200 may be configured to support the weight of a machine 100 ranging from 3,000 lbs. to 250,000 lbs. A track chain 204 including 42 to 46 sets of links 216 may be used for any of the embodiments discussed herein. In some embodiments, 41 sets of links 216 may be used, etc. While specific dimensions, weight, number of links of a track chain, ratios of dimensions, etc. for certain embodiments will be specifically mentioned, it is to be understood that the values for these parameters may be varied as needed or desired in other embodiments not specifically mentioned herein.

The machine 100 may also include a hydraulic cylinder/mechanism 224 for moving the front idler wheel 202a forwardly or rearward to adjust the tension in the track chain 204. A GPS antenna 110 and cab 112 for housing controls and an operator may also be provided depending on the machine 100 and its intended application. These features may be omitted in other embodiments.

Figure 2:
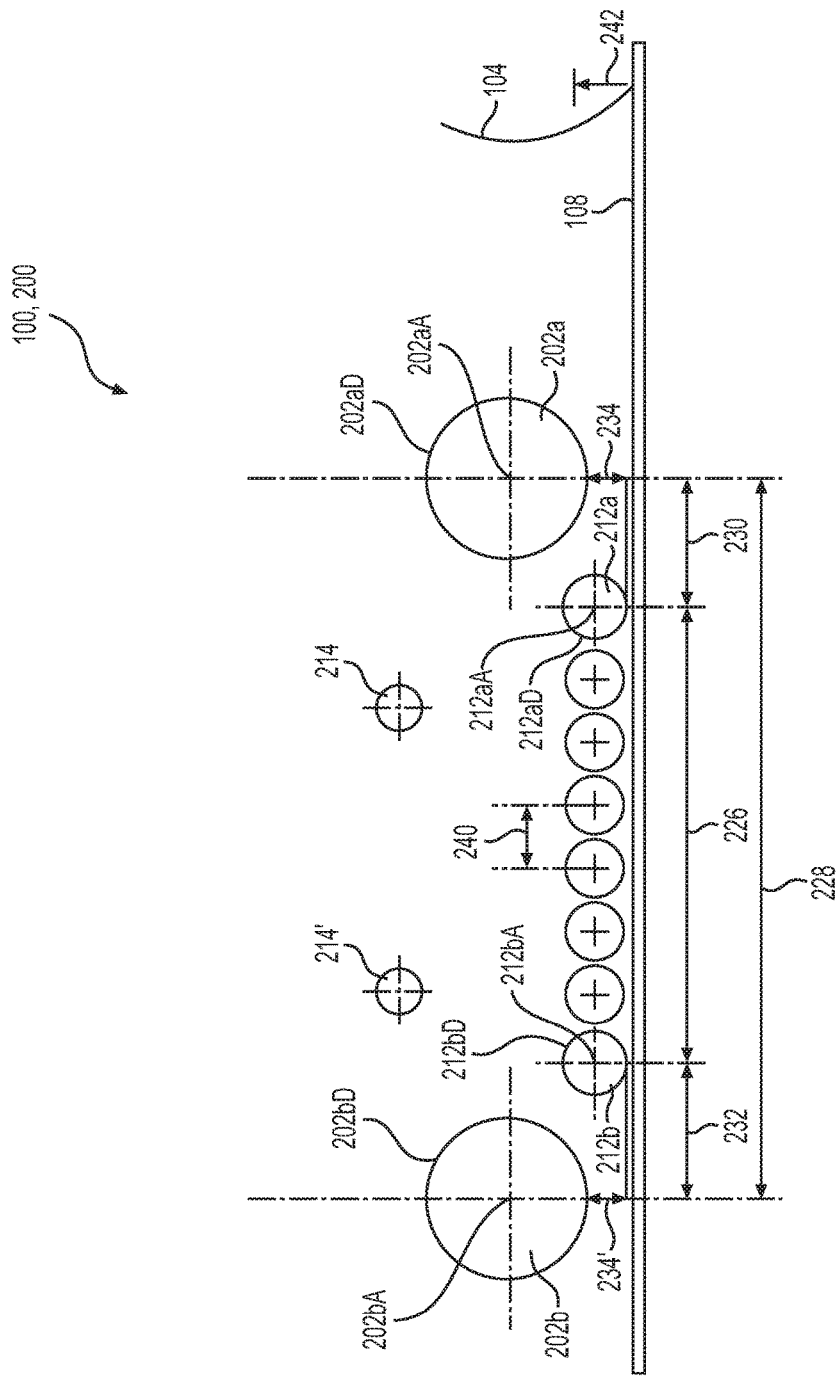
FIG. 2 is a side-view of a schematic representation of various dimensions measured between various components of an undercarriage supporting a track chain according to various embodiments of the present disclosure.

FIG. 2 is a side-view of a schematic representation of various dimensions measured between various components of an undercarriage 200 supporting a track chain 204 (shown in FIG. 1 not FIG. 2) according to various embodiments of the present disclosure. For simplicity, the schematic omits the track chain 204, elevated drive sprocket 206 but it is to be understood that such a drive sprocket may in fact exist or that the rear idler wheel 202b may be a drive sprocket instead. Other configurations are possible. Two top support rollers 214 are also shown. Again, the number of the top support rollers 214 and their positioning may be varied as needed or desired in other embodiments.

FIG. 2 shows that the relevant dimensions of the undercarriage 200 include a bottom support roller platform distance 226, a wheel pitch distance 228, a front transitional zone distance 230, a rear transitional zone distance 232, and an idler height 234. The undercarriage 204 is shown to be sitting on a ground surface 108 and a blade 104 is shown to be attached to the front of the machine 100 near the front of the undercarriage 200.

An undercarriage 200 configured to support a track chain 204 and to be attached to a machine 100 with an endless track drive according to an embodiment of the present disclosure will now be described with reference to FIGS. 2 thru 5.

As best understood with reference to FIGS. 2 and 5, the undercarriage 200 may comprise a plurality of bottom support rollers 212 rotatably attached to the undercarriage 200 including a front bottom support roller 212a defining a front bottom support roller rotational axis 212aA and a rear bottom support roller 212b defining a rear bottom support roller rotational axis 212bA. The undercarriage defines a bottom support roller platform distance 226 measured from the front bottom support roller rotational axis 212aA to the rear bottom support roller rotational axis 212bA. A front wheel (e.g. front idler wheel 202a) is rotatably attached to the undercarriage 200, defining a front wheel rotational axis (e.g. front idler wheel axis 202aA), and a rear wheel 202b is rotatably attached to the undercarriage 200, defining a rear wheel rotational axis 202bA.

The front wheel rotational axis (e.g. front idler wheel rotational axis 202aA) and the rear wheel rotational axis (e.g. rear idler wheel rotational axis 202bA) are positioned vertically above relative to the front bottom support roller rotational axis 212aA and the rear bottom support roller rotational axis 212bA. The undercarriage 200 further defines a wheel pitch distance 228 measured from the front wheel rotational axis (e.g. front idler wheel rotational axis 202aA) to the rear wheel rotational axis (e.g. rear idler wheel rotational axis 202bA), and a ratio of the bottom support roller platform distance 226 to the wheel pitch distance 228 may range from 0.70 to 0.95. This ratio may range from 0.70 to 0.80 in some embodiments. In a particular embodiment, this ratio is 0.761.

The front wheel (e.g. front idler wheel 202a) defines a front wheel diameter (e.g. front idler wheel diameter 202aD) and the rear wheel (e.g. rear idler wheel 202b) defines a rear wheel diameter (e.g. rear idler wheel diameter 202bD). The front bottom support roller 212a defines a front bottom support roller diameter 212aD and the rear bottom support roller 212b defines a rear bottom support roller diameter 212bD. The front wheel diameter (e.g. front idler wheel diameter 202aD) and rear wheel diameter (e.g. rear idler wheel diameter 202bD) are the same for this embodiment, but may not be in other embodiments. The front bottom support roller diameter 212aD and the rear bottom support roller diameter 212bD are the same. The front wheel diameter (e.g. front idler wheel diameter 202aD) is greater than the front bottom support roller diameter 212aD. This may not be the case for other embodiments.

For this embodiment, the front wheel and rear wheel are both idler wheels 202a, 202b, but this may not be the case in other embodiments. The undercarriage 200 further defines a front transitional zone distance 230 measured from the front bottom support roller rotational axis 212aA to the front wheel rotational axis (e.g. front idler wheel rotational axis 202aA) along a direction parallel with the bottom support roller platform distance 226. The transitional zone is so called as the track moves upwardly away from the ground surface 108 toward the front or rear wheel.

The front wheel rotational axis (e.g. front idler wheel rotational axis 202aA) is positioned vertically above relative to the front bottom support roller rotational axis 212aA along a direction perpendicular to the bottom support roller platform distance 226. This arrangement defines an idler height 234 measured from the bottom tangent point 236 of the front bottom support roller 212a to the bottom tangent point 238 of the front wheel (e.g. front idler wheel 202a). The idler height 234 may range from 16 mm to 20 mm and may be approximately 18 mm for the embodiments of FIGS. 3 thru 5.

Figure 3:
FIG. 3 contains a graph showing the improvement in blade (work implement) bounce for a D6T 46 Section Horizon Grading dozer as the machine moves on a rock or gravel surface according to an embodiment of the present disclosure.
Figure 4:
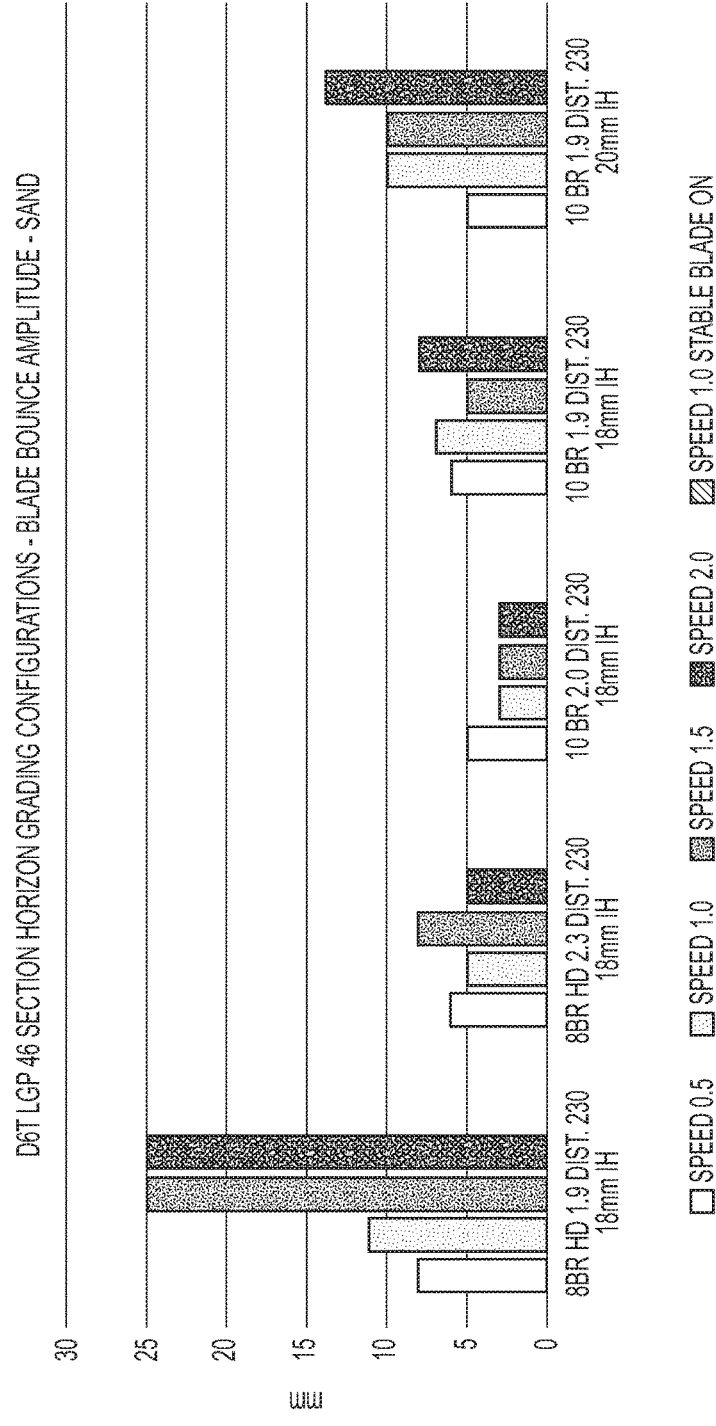
FIG. 4 contains a graph showing the improvement in blade (work implement) bounce for a D6T 46 Section Horizon Grading dozer on a sandy surface according to an embodiment of the present disclosure.

Similarly, FIGS. 3 thru 5 indicate that the plurality of bottom support rollers 212 may range in number from 8 to 10 bottom support rollers depending on the application. Adding bottom support rollers 212 and decreasing the front transitional zone distance 230 may aid in preventing the track chain from experiencing backbend. The idler height 234' and rear transitional zone distance 232, measured in a manner similar to that of idler height 234 and front transitional zone distance 230 respectively, may be adjusted to have the same or similar values to provide similar benefits if so desired in some embodiments, but not necessarily so.

FIG. 3 indicates that using 8 bottom support rollers 212 did not reduce the amount of blade bounce (vertical distance measured in mm that the blade 104 rises above the ground surface 108, represented by 242 in FIG. 2) adequately when the machine 100 moved on a rock or gravel surface 108 but that using 10 bottom support rollers 212 did provide a suitable reduction in blade bounce 242, especially when the front transitional zone distance 230 was reduced. For FIGS. 3 thru 5, the first transitional zone distance 230 is expressed in the number of link pitch distances 222 of the track chain along the front transitional zone distance 230. Reducing the front transitional zone distance 230 to a value of 2.0 link pitch distances 222 or less was helpful in reducing blade bounce 242 when the machine 100 moved on rock or gravel surfaces 108.

FIG. 4 shows that using 8 to 10 bottom support rollers 212 on a sandy surface 108 was suitable to provide enough stability so that the amount of blade bounce 242 the machine 100 experienced was within acceptable parameters. Also, reducing the front transitional zone distance 230 from 2.3 link pitch distances to 2.0 or 1.9 link pitch distances did not affect the amount of blade bounce 242 significantly when the machine 100 moved on a sandy surface 108. However, adding bottom support rollers 212 and decreasing the front or rear transitional zone distances 230, 232 decreased the likelihood that the track chain 204 would backbend.

In both FIGS. 3 and 4, increasing the idler height 234 to 20 mm began to create more blade bounce 242 instead of improving blade bounce 242 as the machine 100 moved over a rock, gravel, or sandy surface 108.

FIG. 5 contains a table showing the relative dimensions of a current production D6T LGP dozer as sold by the assignee of the present application compared to the new designs tested. The top row represents a current production dozer having 45 sets of links 216 and 8 bottom support rollers 212. The bottom support roller platform distance 226 is approximately 2209 mm. The second row shows the change in dimensions made to the current production dozer where 281 mm were added to the bottom support roller platform distance 226 and the number of bottom support rollers 212 was increased to 10. The centerline to centerline distance between the bottom support rollers 212 (i.e. roller spacing distance 240) was reduced to 1.36 link pitch distances (a reduction of −0.019 link pitch distances). It should be noted that for many embodiments discussed herein, all the bottom support rollers 212 are similarly configured and spaced apart the same distance or a similar distance. This may not be the case for other embodiments. For any of the embodiments discussed herein, the ratio of the roller spacing distance 240 to the link pitch distance 222 may range from 0.75 link pitch distances to 1.50 link pitch distances.

The third row shows that a new dozer design using a track chain 204 with 46 sets of links 212 and an increased bottom support roller platform distance 226 of 2394 mm (an increase of 185 mm), provided additional stability but with an increase in roller spacing distance 240 to 1.69 link pitch distances (an increase of 0.14 link pitch distances), was also tested. Finally, the bottom row shows that a new dozer design using a track chain 204 with an increased bottom support roller platform distance 226 of 2556 mm (an increase of 347 mm), resulted in a roller spacing distance 240 of 1.4 link pitch distances (a reduction of −0.15 link pitch distances).

All three new designs as well as a design having 9 bottom support rollers 212 (not specifically described in detail herein) were tested and found to work satisfactory as the blade bounce 242 as the machine 100 moved on a rock or gravel surface or a sandy surface 108 was within acceptable parameters.

Figure 6:
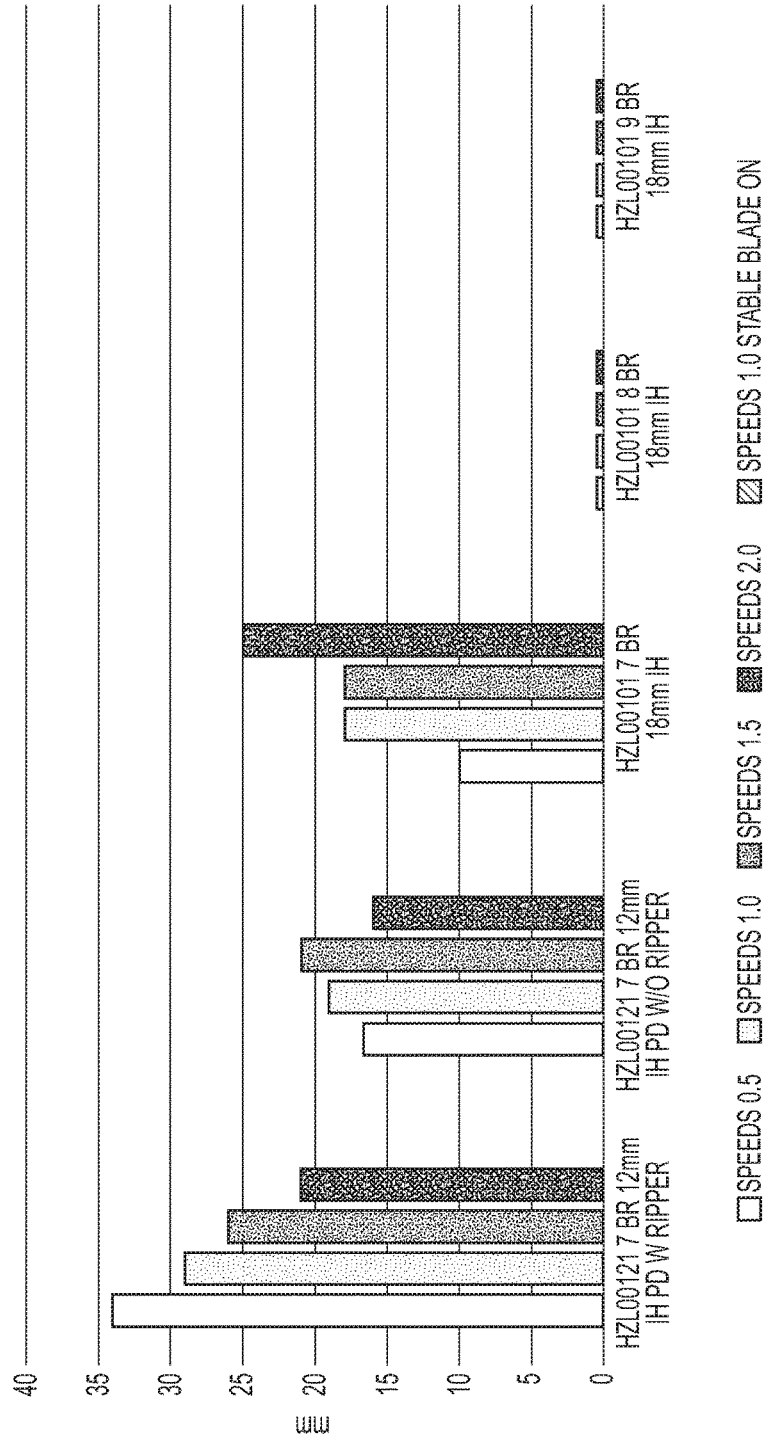
FIG. 6 contains a graph showing the improvement in blade (work implement) bounce for a D6T XL 42 Section Horizon Grading dozer as the machine moves on a rock or gravel surface according to an embodiment of the present disclosure.
Figure 7:
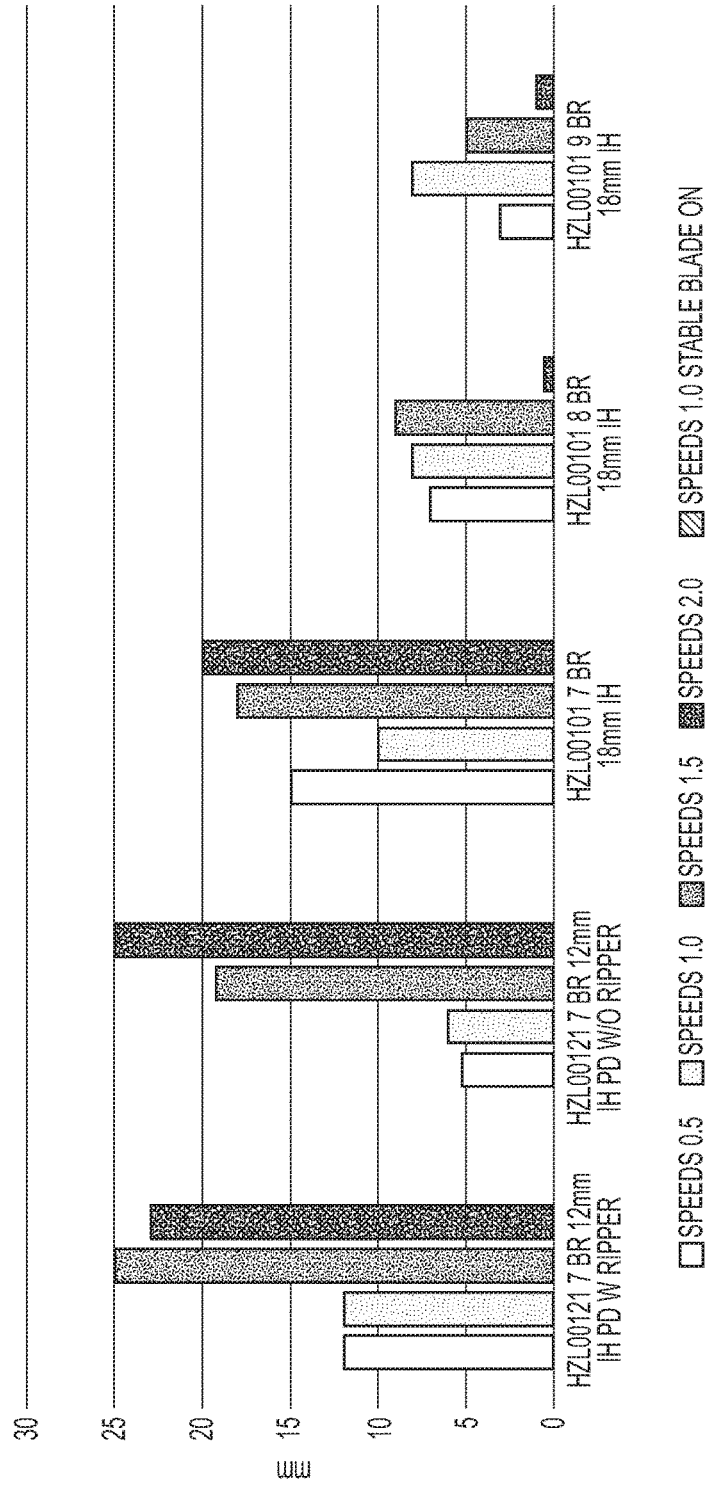
FIG. 7 contains a graph showing the improvement in blade (work implement) bounce for a D6T XL 42 Section Horizon Grading dozer as the machine moves on a sandy surface according to an embodiment of the present disclosure.

Looking now at FIGS. 6 thru 8, more embodiments of the present disclosure will now be discussed relative to a current production design used as a baseline. FIG. 6 shows that when a dozer used in current production that uses 7 bottom support rollers 212 produced unacceptable blade bounce 242 when the machine 100 moved on a rock or gravel surface 108 even with an increase in the idler height 234. However, when 8 or 9 bottom support rollers 212 were used and the idler height 234 was increased to 18 mm, then the blade bounce was reduced dramatically. Similarly, FIG. 7 shows that blade bounce 242 was also improved using 8 or 9 bottom support rollers 212 and increased idler height 234 of 18 mm as compared to the baseline design when the machine 100 moved on a sandy surface 108.

FIG. 8 contains a table showing the relative dimensions of a current production D6T XL dozer as sold by the assignee of the present application compared to the new designs tested. The top row represents a current production dozer having a track chain 204 with 41 sets of links 216 and 7 bottom support rollers 212. The bottom support roller platform distance 226 is approximately 1987 mm. The second row shows the changes in dimensions made to the current production dozer where 83 mm were added to the bottom support roller platform distance 226 (changed to 2070 mm) and the number of bottom support rollers 212 was kept at 7 bottom support rollers 212. Also, a new track chain 204 using 42 pairs of links 216 was used. The centerline to centerline distance of the bottom support rollers 212 (roller spacing distance 240) was increased to 1.73 link pitch distances (an increase of 0.1 link pitch distances). The third row shows that a new dozer design using a track chain 204 with 42 sets of links 216 and increased bottom support roller platform distance 226 of 2187 mm (an increase of 200 mm), which provided additional stability while also decreasing the roller spacing distance 240 to 1.54 link pitch distances (a reduction of −0.09 link pitch distances) by increasing the number of bottom support rollers 212 to 8, was also tested. Finally, the bottom row shows that a new dozer design using a track chain 204 with 42 sets of links 216 and an increased bottom support roller platform distance 226 of 2187 mm (an increase of 200 mm), resulted in a roller spacing distance 240 of 1.35 link pitch distances (a reduction of −0.28 link pitch distances) by increasing the number of bottom support rollers 212 to 9. Best results during testing were achieved by the designs shown in the bottom two rows.

Similarly, FIG. 9 contains a table similar to that of FIG. 5, with the two top rows showing designs corresponding to the top two rows of FIG. 5. Additional new designs are contained in the bottom two rows that still use a track chain 204 with 45 sets of links 216. For the design shown in the third row, the bottom support roller platform distance 226 was increased by 194 mm to a total of 2403 mm. Since 8 bottom support rollers 212 were still only used, the roller spacing distance 240 increased by 0.11 link pitch distances to a total of 1.66 link pitch distances. The bottom row shows a design that also uses a track chain 204 with 45 sets of links 216. The bottom support roller platform distance 226 was increased by 268 mm to a total of 2477 mm. But, 10 bottom support rollers 212 were provided, decreasing the roller spacing distance 240 by 0.19 link pitch distances to 1.36 link pitch distances. The designs shown in rows two, three and four all showed an improvement in performance in terms of blade bounce 242 and/or backbend. When 8 bottom support rollers 212 were used, it was found that having a front transitional zone distance 230 of 2.0 link pitch distances or less (e.g. 1.9 link pitch distances) worked best.

Referring now to FIG. 2 and FIG. 10, additional dimensions of various embodiments of an undercarriage 200 that support a track chain 204 will be discussed. The top two rows of FIG. 10 illustrate current production designs. The third and fifth rows also show current production designs. The fourth and sixth rows show revised undercarriages 200 according to various embodiments of the present disclosure as compared to the third and fifth rows respectively. The wheel pitch distance 228 has not changed between the third and fourth rows (i.e. 3250 mm). Likewise, the wheel pitch distance 228 has not changed between the fifth and sixth rows (i.e. 3355 mm). In addition to the front transitional zone distance 230 values, the values of the rear transitional zone distance 232 is also shown for each design. For the design shown in fourth row, the rear transitional zone distance 232 was decreased to 355 mm and a link pitch distance value of 1.8 while the front transitional zone distance 230 was decreased to 405 mm and a link pitch distance value of 2.0. Similarly, the design shown in the sixth row had a rear transitional zone distance 232 that was decreased to 413.7 mm and a link pitch distance with a value of 2.0 while the front transitional zone distance 230 was decreased to 385.3 mm and a link pitch distance with a value of 1.9.

INDUSTRIAL APPLICABILITY

In practice, machine with an undercarriage configured to support a track chain, or an undercarriage configured to support a track chain according to any embodiment described herein may be sold, bought, manufactured or otherwise obtained in an OEM or after-market context.

In particular, referring to FIGS. 1 and 2, a machine 100 with an endless track drive may be provided with an undercarriage 200 configured to support the track chain 204. The machine 100 may comprise an undercarriage 200 including a plurality of bottom support rollers 212 rotatably attached to the undercarriage 212 including a front bottom support roller 212a defining a front bottom support roller rotational axis 212aA and a rear bottom support roller 212b defining a rear bottom support roller rotational axis 212bA. The undercarriage 200 may define a bottom support roller platform distance 212 measured from the front bottom support roller rotational axis 212aA to the rear bottom support roller rotational axis 212bA, and a front wheel (e.g. front idler wheel 202a) rotatably attached to the undercarriage 200, defining a front wheel rotational axis (e.g. front idler wheel rotational axis 202aA). The undercarriage 200 may also include a rear wheel (e.g. rear idler wheel 202b) rotatably attached to the undercarriage 200, defining a rear wheel rotational axis (e.g. rear idler wheel rotational axis 202bA).

The front wheel rotational axis (e.g. front idler wheel rotational axis 202aA) and the rear wheel rotational axis (e.g. rear idler wheel rotational axis 202bA) are positioned vertically above relative to the front bottom support roller rotational axis 212aA and the rear bottom support roller rotational axis 212bA, and the undercarriage 200 further defines wheel pitch distance 228 measured from the front wheel rotational axis (e.g. front idler wheel rotational axis 202aA) to the rear wheel rotational axis (e.g. rear idler wheel rotational axis 202bA).

As mentioned, previously the weight of the machine 100 may range from 3,000 lbs. to 250,000 lbs. in some embodiments.

The machine 100 may further comprising an elevated drive sprocket 206, and a track chain 204 routed about the front wheel such as 202a, and the rear wheel such as 202b, and underneath the plurality of bottom support rollers 212. The track chain 204 may comprise 42 to 46 sets of links 216, each set of links 216 being joined to each other by a track pin 218 or bushing 220, defining a track pin longitudinal axis 218A or a bushing longitudinal axis 220A and a link pitch distance 222 from one track pin longitudinal axis 218A to the adjacent track pin longitudinal axis 218A'. Other embodiments may have 41 sets of links, etc.

In some embodiments, the number of the plurality of bottom support rollers 212 may range from 8 to 10. Also, the number of link pitch distances 222 equivalent to the bottom support roller platform distance 226 may be greater than 12.0 and the number of link pitch distances 222 equivalent to the front transitional zone distance 230 may be less than or equal to 2.0. Similarly, the number of link pitch distances 222 equivalent to the rear transitional zone distance 232 may be less than or equal to 2.0. Put another way, both the front transitional zone distance 230 and the rear transitional zone distance 232 may range from 1.0 link pitch distance to 2.0 link pitch distances in some embodiments. In any of the embodiments discussed herein, a ratio of the front transitional zone distance 230 to the link pitch distance 222 or a ratio of the rear transitional zone distance 232 to the link pitch distance 222 may range from 1.0 link pitch distance to 2.30 link pitch distances.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. An undercarriage configured to support a track chain and to be attached to a machine with an endless track drive, the undercarriage comprising:
   a plurality of bottom support rollers rotatably attached to the undercarriage including a front bottom support roller defining a front bottom support roller rotational axis and a rear bottom support roller defining a rear bottom support roller rotational axis, and further defining a bottom support roller platform distance measured from the front bottom support roller rotational axis to the rear bottom support roller rotational axis and a roller spacing distance measured from the centerline of one bottom support roller to the centerline of the adjacent bottom support roller;
   a front wheel rotatably attached to the undercarriage, defining a front wheel rotational axis;
   a rear wheel rotatably attached to the undercarriage, defining a rear wheel rotational axis; and
   a track chain including sets of links, each set of links being joined to each other by a track pin or bushing, defining a track pin longitudinal axis or a bushing longitudinal axis and a link pitch distance equivalent to the overall length of one link;
   wherein the front wheel rotational axis and the rear wheel rotational axis are positioned vertically above relative to the front bottom support roller rotational axis and the rear bottom support roller rotational axis, and the undercarriage further defines a wheel pitch distance measured from the front wheel rotational axis to the rear wheel rotational axis, and a ratio of the bottom support roller platform distance to the wheel pitch distance ranges from 0.70 to 0.95 and a ratio of the roller spacing distance to the link pitch distance ranges from 0.75 link pitch distance to 1.50 link pitch distances.

2. The undercarriage of claim 1 wherein the front wheel defines a front wheel diameter, the rear wheel defines a rear wheel diameter, a front bottom support roller defines a front bottom support roller diameter, the rear bottom support roller defines a rear bottom support roller diameter, the front wheel diameter and rear wheel diameter are the same, the front bottom support roller diameter and the rear bottom support roller diameter are the same, and the front wheel diameter is greater than the front bottom support roller diameter.

3. The undercarriage of claim 2 wherein the front wheel and rear wheel are both idler wheels, and the undercarriage further defines a front transitional zone distance measured from the front bottom support roller rotational axis to the front wheel rotational axis along a direction parallel with the bottom support roller platform distance, and a ratio of the front transitional zone distance to the link pitch distance ranges from 1.0 link pitch distance to 2.30 link pitch distances.

4. The undercarriage of claim 3 wherein the front wheel rotational axis and is positioned vertically above relative to the front bottom support roller rotational axis along a direction perpendicular to the bottom support roller platform distance, defining an idler height measured from the bottom tangent point of the front bottom support roller to the bottom tangent point of the front wheel the idler height ranging from 16 mm to 20 mm.

5. The undercarriage of claim 4 wherein the plurality of bottom support rollers ranges in number from 8 to 10 bottom support rollers.

6. The undercarriage of claim 4, wherein the idler height is 18 mm.

7. The undercarriage of claim 1 wherein the undercarriage further defines a rear transitional zone distance measured from the rear bottom support roller rotational axis to the rear wheel rotational axis along a direction parallel with the bottom support roller platform distance, and a ratio of the rear transitional zone distance to the link pitch distance ranges from 1.0 link pitch distance to 2.30 link pitch distances.

8. An undercarriage configured to support a track chain and be attached to a machine with an endless track drive, the undercarriage comprising:
a plurality of bottom support rollers rotatably attached to the undercarriage including a front bottom support roller defining a front bottom support roller rotational axis and a rear bottom support roller defining a rear bottom support roller rotational axis, and further defining a bottom support roller platform distance measured from the front bottom support roller rotational axis to the rear bottom support roller rotational axis a roller spacing distance measured from the centerline of one bottom support roller to the centerline of the adjacent bottom support roller;
a front wheel rotatably attached to the undercarriage, defining a front wheel rotational axis;
a rear wheel rotatably attached to the undercarriage, defining a rear wheel rotational axis; and
a track chain routed about the plurality of bottom support rollers, front wheel, and rear wheel, the track chain including sets of links, each set of links being joined to each other by a track pin or bushing, defining a track pin longitudinal axis or a bushing longitudinal axis and a link pitch distance equivalent to the overall length of one link;
wherein the front wheel rotational axis and the rear wheel rotational axis are positioned vertically above relative to the front bottom support roller rotational axis and the rear bottom support roller rotational axis, and the undercarriage further defines a wheel pitch distance measured from the front wheel rotational axis to the rear wheel rotational axis, and a front transitional zone distance measured from the front bottom support roller rotational axis to the front wheel rotational axis along a direction parallel with the bottom support roller platform distance, and a ratio of the front transitional zone distance to the link pitch distance ranges from 1.0 link pitch distance to 2.30 link pitch distances, and a ratio of the roller spacing distance to the link pitch distance ranges from 0.75 link pitch distance to 1.50 link pitch distances.

9. The undercarriage of claim 8, wherein the undercarriage further defines a bottom support roller platform distance measured from the front bottom support roller rotational axis to the rear bottom support roller rotational axis, and a ratio of the bottom support roller platform distance to the wheel pitch distance ranges from 0.70 to 0.95.

10. The undercarriage of claim 9 wherein the front wheel defines a front wheel diameter, the rear wheel defines a rear wheel diameter, a front bottom support roller defines a front bottom support roller diameter, the rear bottom support roller defines a rear bottom support roller diameter, the front wheel diameter and rear wheel diameter are the same, the front bottom support roller diameter and the rear bottom support roller diameter are the same, and the front wheel diameter is greater than the front bottom support roller diameter.

11. The undercarriage of claim 10 wherein front wheel rotational axis and is positioned vertically above relative to the front bottom support roller rotational axis along a direction perpendicular to the bottom support roller platform distance, defining an idler height measured from the bottom tangent point of the front bottom support roller to the bottom tangent point of the front wheel, the idler height ranging from 16 mm to 20 mm.

12. The undercarriage of claim 11 wherein the number of the plurality of bottom support rollers ranges from 8 to 10.

13. The undercarriage of claim 12 wherein the undercarriage is attached to machine having a weight ranging from 3,000 lbs. to 250,000 lbs. and track chain is mounted on the undercarriage having 42 to 46 sets of track links.

14. The undercarriage of claim 11 wherein the idler height is 18 mm.

15. The undercarriage of claim 8 wherein the undercarriage further defines a rear transitional zone distance measured from the rear bottom support roller rotational axis to the rear wheel rotational axis along a direction parallel with the bottom support roller platform distance, and a ratio of the rear transitional zone distance to the link pitch distance ranges from 1.0 link pitch distance to 2.30 link pitch distances.

16. The undercarriage of claim 15 wherein the ratio of the rear transitional zone distance or the front transitional zone distance to the link pitch distance ranges from 1.0 link pitch distance to 2.0 link pitch distances.

* * * * *